(12) United States Patent
Sheth et al.

(10) Patent No.: US 7,656,905 B2
(45) Date of Patent: Feb. 2, 2010

(54) APPARATUS AND METHOD FOR AGGREGATION AND TRANSPORTATION OF GIGABIT ETHERNET AND OTHER PACKET BASED DATA FORMATS

(76) Inventors: Samir Sheth, 4520 Turnberry Ct., Plano, TX (US) 75024; Brian Royal, 6317 Glenmoor Dr., Garland, TX (US) 75043; Kelly Hawkins, 1515 Rio Grande #1615, Plano, TX (US) 75075

( * ) Notice: Subject to any disclaimer, the term of this patent is extended or adjusted under 35 U.S.C. 154(b) by 680 days.

(21) Appl. No.: 10/746,841

(22) Filed: Dec. 24, 2003

(65) Prior Publication Data

US 2004/0202205 A1 Oct. 14, 2004

Related U.S. Application Data

(60) Provisional application No. 60/436,401, filed on Dec. 24, 2002.

(51) Int. Cl.
 *H04J 3/06* (2006.01)
(52) U.S. Cl. .................... 370/503; 370/537
(58) Field of Classification Search ........... 370/391, 370/538, 503, 505–507, 537
 See application file for complete search history.

(56) References Cited

U.S. PATENT DOCUMENTS

| | | | |
|---|---|---|---|
| 4,229,831 A | 10/1980 | Lacher | |
| 4,258,434 A * | 3/1981 | Glowinski et al. | 370/358 |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,189,410 A | 2/1993 | Kosugi et al. | 340/825.2 |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |

(Continued)

FOREIGN PATENT DOCUMENTS

JP  01/115230  5/1989

(Continued)

OTHER PUBLICATIONS

Microsoft Computer Dictionary, Fifth Edition, Microsoft Press 2002.*

(Continued)

*Primary Examiner*—Aung S Moe
*Assistant Examiner*—Kerri M Rose
(74) *Attorney, Agent, or Firm*—Woodcock Washburn LLP

(57) ABSTRACT

The invention provides an apparatus and method for transparently transporting four plesiochronous Gigabit Ethernet, Fibre Channel or other packet-based data signals over a network. Multiple plesiochronous Gigabit Ethernet data streams are aggregated onto an independent clock source at an ingress circuit through the use of transparent IDLE character insertion. The independent clock is selected such that the output data rate is greater than the composite input data rate of all the plesiochronous data streams. The signals are encapsulated with forward error correction and mapped to a reciprocal FEC interface prior to transport. An egress circuit at the receiving end recovers the modulated signal and extracts the data stream. Each independent data stream is mapped to a local clock domain via IDLE character insertion or removal. Therefore, the input and output signals are transparent and identical in content.

62 Claims, 6 Drawing Sheets

U.S. PATENT DOCUMENTS

| | | | |
|---|---|---|---|
| 5,321,541 A | 6/1994 | Cohen | |
| 5,452,124 A | 9/1995 | Baker | |
| 5,455,703 A | 10/1995 | Duncan et al. | |
| 5,493,566 A | 2/1996 | Ljungberg et al. | 370/231 |
| 5,559,625 A | 9/1996 | Smith et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,742,416 A | 4/1998 | Mizrahi | |
| 5,778,116 A | 7/1998 | Tomich | |
| 5,790,285 A | 8/1998 | Mock | |
| 5,812,290 A | 9/1998 | Maeno et al. | |
| 5,812,306 A | 9/1998 | Mizrahi | |
| 5,877,881 A | 3/1999 | Mivauchi et al. | |
| 5,903,613 A | 5/1999 | Ishida | |
| 5,914,794 A | 6/1999 | Fee | |
| 5,914,799 A | 6/1999 | Tan | |
| 5,936,753 A | 8/1999 | Ishikaawa | |
| 5,940,209 A | 8/1999 | Nguyen | |
| 5,940,456 A | 8/1999 | Chen et al. | |
| 5,963,350 A | 10/1999 | Hill | |
| 5,995,694 A | 11/1999 | Akasaka et al. | |
| 6,005,702 A | 12/1999 | Suzuki et al. | |
| 6,021,245 A | 2/2000 | Berger et al. | |
| 6,038,062 A | 3/2000 | Kosaka | |
| 6,075,634 A | 6/2000 | Casper et al. | |
| 6,078,414 A | 6/2000 | Iwano | |
| 6,081,360 A | 6/2000 | Ishikawa et al. | |
| 6,084,694 A | 7/2000 | Milton et al. | |
| 6,088,152 A | 7/2000 | Berger et al. | |
| 6,108,074 A | 8/2000 | Bloom | |
| 6,122,095 A | 9/2000 | Fatehi | |
| 6,151,334 A | 11/2000 | Kim et al. | |
| 6,157,477 A | 12/2000 | Robinson | |
| 6,160,614 A | 12/2000 | Unno | |
| 6,163,392 A | 12/2000 | Condict et al. | |
| 6,163,636 A | 12/2000 | Stentz et al. | |
| 6,173,094 B1 | 1/2001 | Bowerman et al. | |
| 6,177,985 B1 | 1/2001 | Bloom | |
| 6,198,559 B1 | 3/2001 | Gehlot | |
| 6,229,599 B1 | 5/2001 | Galtarossa | |
| 6,236,481 B1 | 5/2001 | Laor | |
| 6,236,499 B1 | 5/2001 | Berg et al. | |
| 6,246,510 B1 | 6/2001 | BuAbbud et al. | |
| 6,259,553 B1 | 7/2001 | Kinoshita | |
| 6,259,554 B1 | 7/2001 | Shigematsu et al. | |
| 6,259,693 B1 | 7/2001 | Ganmukhi et al. | |
| 6,259,845 B1 | 7/2001 | Sardesai | |
| 6,272,185 B1 | 8/2001 | Brown | |
| 6,275,315 B1 | 8/2001 | Park et al. | |
| 6,288,811 B1 | 9/2001 | Jiang et al. | |
| 6,288,813 B1 | 9/2001 | Kirkpatrick et al. | |
| 6,307,656 B2 | 10/2001 | Terahara | |
| 6,317,231 B1 | 11/2001 | Al-Salameh et al. | |
| 6,317,255 B1 | 11/2001 | Fatehi et al. | |
| 6,323,950 B1 | 11/2001 | Kim et al. | |
| 6,327,060 B1 | 12/2001 | Otani et al. | |
| 6,356,384 B1 | 3/2002 | Islam | |
| 6,359,729 B1 | 3/2002 | Amoruso | |
| 6,388,801 B1 | 5/2002 | Sugaya et al. | |
| 6,396,853 B1 | 5/2002 | Humphrey et al. | |
| 6,519,082 B2 | 2/2003 | Ghera et al. | |
| 6,657,962 B1 | 12/2003 | Barri et al. | |
| 6,671,256 B1 | 12/2003 | Xiong et al. | 370/230 |
| 6,704,882 B2* | 3/2004 | Zabinski et al. | 713/401 |
| 6,721,268 B1 | 4/2004 | Ohira et al. | 370/223 |
| 6,721,295 B1* | 4/2004 | Brown | 370/335 |
| 6,728,492 B1 | 4/2004 | Baroncelli | 398/154 |
| 6,744,787 B1 | 6/2004 | Schatz et al. | 370/506 |
| 6,751,743 B1 | 6/2004 | Theodoras et al. | 713/400 |
| 6,859,437 B2 | 2/2005 | Miller et al. | |
| 7,016,344 B1 | 3/2006 | Martin | 370/359 |
| 7,042,908 B1 | 5/2006 | Mayer | 370/503 |
| 7,215,637 B1 | 5/2007 | Ferguson et al. | 370/230.1 |
| 7,257,120 B2 | 8/2007 | Saunders et al. | 370/395.21 |
| 7,301,954 B1 | 11/2007 | Chu | 370/412 |
| 7,304,952 B2 | 12/2007 | Scholten et al. | |
| 7,324,548 B2* | 1/2008 | Natarajan et al. | 370/465 |
| 7,333,438 B1 | 2/2008 | Rabie et al. | 370/242 |
| 7,346,058 B1 | 3/2008 | Natarajan et al. | 370/392 |
| 7,369,498 B1 | 5/2008 | Ma et al. | |
| 7,372,812 B2 | 5/2008 | Fujiyoshi | |
| 7,443,794 B2 | 10/2008 | George et al. | |
| 2001/0005271 A1 | 6/2001 | Leclerc et al. | |
| 2001/0007605 A1 | 7/2001 | Inagaki et al. | |
| 2001/0009468 A1 | 7/2001 | Fee | |
| 2001/0014104 A1* | 8/2001 | Bottorff et al. | 370/471 |
| 2001/0053161 A1 | 12/2001 | Tomizawa et al. | |
| 2002/0012152 A1 | 1/2002 | Agazzi et al. | |
| 2002/0015220 A1 | 2/2002 | Papernyl et al. | |
| 2002/0034197 A1* | 3/2002 | Tornetta et al. | 370/535 |
| 2002/0037018 A1* | 3/2002 | Lentine et al. | 370/521 |
| 2002/0044317 A1 | 4/2002 | Gentner et al. | |
| 2002/0044324 A1 | 4/2002 | Hoshida et al. | |
| 2002/0048287 A1 | 4/2002 | Silvers | |
| 2002/0051468 A1 | 5/2002 | Ofek et al. | |
| 2002/0063948 A1 | 5/2002 | Islam et al. | |
| 2002/0064181 A1 | 5/2002 | Ofek et al. | |
| 2002/0075903 A1 | 6/2002 | Hind | |
| 2002/0080809 A1 | 6/2002 | Nicholson et al. | |
| 2002/0110157 A1* | 8/2002 | Jorgenson et al. | 370/537 |
| 2002/0138611 A1 | 9/2002 | Roe et al. | 709/224 |
| 2003/0016705 A1 | 1/2003 | Bellato et al. | |
| 2003/0055998 A1 | 3/2003 | Saha et al. | |
| 2003/0093567 A1 | 5/2003 | Lolayekar et al. | 709/246 |
| 2003/0097600 A1 | 5/2003 | Wong | 713/400 |
| 2003/0112833 A1 | 6/2003 | Kamiya | 370/535 |
| 2003/0235215 A1* | 12/2003 | Carrel et al. | 370/506 |
| 2004/0246977 A1 | 12/2004 | Dove et al. | 370/395.61 |
| 2007/0031153 A1* | 2/2007 | Aronson et al. | 398/138 |

FOREIGN PATENT DOCUMENTS

| | | |
|---|---|---|
| JP | 02238736 | 9/1990 |

OTHER PUBLICATIONS

DeCusatis, C., "Dense wavelength division multiplexing for Parallel Sysplex and metropolitan/storage area networks," *Optical Networks Magazine, SPIE*, Bellingham, WA, US, vol. 2, No. 1, Jan. 2001, pp. 69-80, XP001065802.

Nujeerallee, S. et al., "Storage Area Networking," *British Telecommunications Engineering*, vol. 3, Part 1, Jan. 2004, pp. 48-58, XP001227050.

Mohr, U., "Optical storage networking," *Proceedings of the SPIE*, Bellingham, WA, US, vol. 4534, 2001, pp. 190-198, XP009060022.

United States Patent and Trademark Office: Non-Final Office Action dated Aug. 20, 2007, U.S. Appl. No. 10/402,314, 8 pages.

United States Patent and Trademark Office: Non-Final Office Action dated Oct. 4, 2007, U.S. Appl. No. 10/402,314, 9 pages.

United States Patent and Trademark Office: Final Office Action dated Apr. 16, 2008, U.S. Appl. No. 10/402,314, 10 pages.

United States Patent and Trademark Office: Non-Final Office Action dated Aug. 4, 2008, U.S. Appl. No. 11/006,939, filed Dec. 8, 2004, 15 pages.

European Application No. EP09075216.3, Search Report dated Jul. 16, 2009.

* cited by examiner

Egress Block

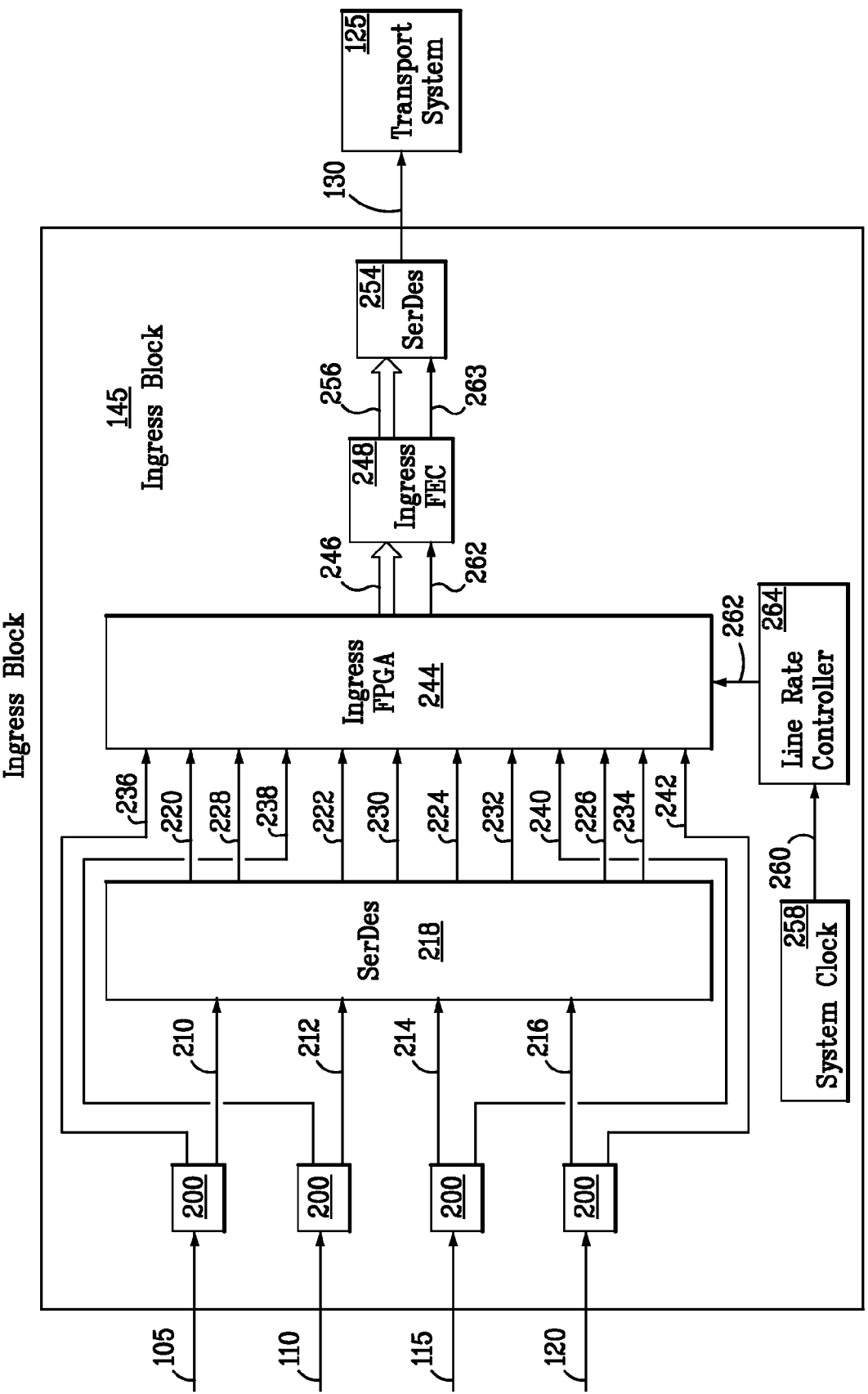

Ingress FPGA

Egress FPGA

APPARATUS AND METHOD FOR AGGREGATION AND TRANSPORTATION OF GIGABIT ETHERNET AND OTHER PACKET BASED DATA FORMATS

CROSS-REFERENCE TO RELATED APPLICATIONS

This application claims the benefit of U.S. Provisional Application No. 60/436,401, filed Dec. 24, 2002, the disclosure of which is incorporated herein by reference in its entirety.

This application is related by subject matter to U.S. patent application Ser. No. 10/402,314, filed Mar. 28, 2003.

FIELD OF THE INVENTION

This invention relates to a computer system that permits multiplexing and transparent transportation of multiple Gigabit Ethernet, Fibre Channel and other packet based data streams without protocol conversion over a high-speed data channel with Forward Error Correction.

BACKGROUND OF THE INVENTION

Gigabit Ethernet (GBE) and Fibre Channel (FC) dominate the enterprise data communications market today. Gigabit Ethernet is a dominant player in high-speed Local Area Network (LAN) backbones and server connectivity. Fibre Channel is the dominant protocol today for connecting Storage Area Networks (SAN). There are other protocols such as FICON that have the same physical layer interface as Fibre Channel and can be transported using the methods described here. Gigabit Ethernet and Fibre Channel protocols enable transmission of high-speed signals across geographically disperse computers and storage systems.

Traditionally, file servers with large external disks or disk farms using the SCSI standard have been used to support applications requiring large amounts of data storage. As applications increased, the storage system capacities and bandwidth (data transfer speed) requirements increased. The SCSI standard limitations made scaling difficult. The servers could only access data on devices directly attached to them. Failure of the server or SCSI hardware could cause an access failure. Also, SCSI supports only a finite number of devices and is therefore not scalable. The parallel structure of SCSI results in distance limitations that require equipment to be co-located.

Storage Area Networks (SAN) were implemented to overcome the limitations of the SCSI architecture. The SAN is a network between the servers and the storage devices. A SAN allows multiple servers to access any storage device. This increases fault tolerance and overcomes the distance limitation since the server and storage do not need to be co-located. The dominant networking technology for implementing SAN is Fibre Channel.

Fibre Channel technology [ANSI X3T11] was designed to enable high-speed data transfer between computer systems and storage devices. It supports common transport protocols including Internet Protocol and SCSI. It supports high-speed data transfer at standard rates of 1 Gbps, 2 Gbps, 4 Gbps, and 10 Gbps. It also supports communications across extended distances enabling corporations to have off-site storage thus enabling applications like disaster recovery and business continuity.

The Ethernet standard defined by IEEE 802.3 has been the dominant networking protocol since its inception in the early 1970's. Ethernet has the highest number of installed ports and provides the greatest cost performance of all the networking protocols. Fast Ethernet boosted the transmission speed of Ethernet from 10 Mbps to 100 Mbps. Gigabit Ethernet builds on top of Fast Ethernet and increases the speed to 1 Gbps.

The Gigabit Ethernet protocol, which was standardized in June 1998, combines the networking features of Ethernet and the physical interface of Fibre Channel. IEEE 802.3 Ethernet and ANSI X3T11 Fibre Channel were merged to accelerate the Ethernet physical interface from 100 Mbps to 1 Gbps. It allows higher speed communications while leveraging the knowledge base of Ethernet for manageability and maintainability. Leveraging the two technologies allows the standard to take advantage of the existing high speed Fibre Channel physical interface while maintaining compatibility with IEEE 802.3 Ethernet.

Gigabit Ethernet itself can also be used to connect SAN. Recent advancements in SCSI have resulted in the iSCSI standard. This standard connects SAN via Gigabit Ethernet protocol.

Gigabit Ethernet adopted the 8B/10B-encoding scheme from Fibre Channel FC-1 layer. The 1 Gbps Ethernet Data or the 800 Mbps Fibre Channel data are 8b/10b encoded to generate output data rates of 1.25 Gbps and 1.0625 Gbps respectively. FC-1 defines the transmission protocol, serial encoding/decoding, special characters, and error control. Encoding the data has several advantages. It maintains DC balance, enhances bit-level clock recovery, enables error correction, and allows separation of data and control characters.

Gigabit Ethernet and Fibre Channel use disparity in the FC-1 layer to maintain DC balance. Depending on the DC balance, positive or negative disparity is chosen when converting from 8b to 10b. The disparity is adjusted to maintain the DC balance at zero (equal number of ones and zeroes in the signal). Positive or negative disparity is chosen to make the DC balance more positive or more negative depending on the error. Alternate sets of control characters are transmitted depending on disparity chosen. Gigabit Ethernet may use either positive or negative running disparity at the beginning of transmission. The Fibre Channel specification fixes the beginning running disparity as negative.

From a transport perspective, the data may be sent in the 8b format or 10b format. However, since Ethernet can choose either positive or negative beginning disparity, if the data is sent in the 8b mode, it is no longer transparent. If user defined control characters are inserted that do not have an alternate for disparity, then transparency may be lost. Therefore it is optimal to send Ethernet data in the 10b mode. Since the Fibre Channel specification defines the beginning running disparity as negative always, Fibre Channel may be sent in either 8b or 10b mode. Sending in the 8b mode reduces the amount of data sent and has advantages in terms of reducing credit-buffering requirements in flow control implementations.

An aggregation function is required to multiplex multiple Gigabit Ethernet data streams and Fibre Channel data streams over one high-speed optical link. The speed of data transmission over optical networks has increased drastically in recent years. Consequently, as new high-speed equipment is connected into optical networks, it is often desirable to multiplex lower speed equipment into the higher speed network for transport in order to take advantage of the transport capacity at the higher speed.

Multiplexing slower data streams gives rise to certain problems. For instance, the input and output clocks may be +/−100 ppm apart and still satisfy the Ethernet standard. In order to multiplex data streams from a slower GBE clock to a faster GBE clock, characters have to be added that do not affect the overall data transmission. Going from a faster to a slower clock requires characters to be removed from the data stream without affecting the data transmission. Transport service customers using the network often find changes to the frames unacceptable, preferring a "seamless" or "transparent" transport of packets. In the art, "seamless" transport is known as "transparency". So, a method of matching the clocks is required that maintains transparency.

High-speed optical networks must reproduce each packet exactly in order to maintain transparency. Any operations that alter the packets can result in loss of data. Thus, transparency for Ethernet and Fibre Channel signals is the ability to transport packets across the network without errors and with the same disparity.

Input data must be mapped to a common clock domain for aggregation. The input data from the client arrives at the transport system client interface having different clock domains. The clock rates may be +/−100 ppm apart per the Ethernet specification. This data must be mapped to a single clock domain at the FEC interface prior to transport. The Ingress circuitry is designed to map these client data streams to the same clock domain without affecting transparency. Therefore, a stuffing method is required that does not affect disparity.

Idle characters may be inserted or removed from the data stream in order to maintain the same disparity and transparency. The Gigabit Ethernet data stream consists of packets of data separated by Idle characters. There are two types of Idle characters: Idle 1 characters toggle the disparity whereas Idle 2 characters maintain the same disparity. The method of insertion and removal of Idle 2 characters is used to maintain the same disparity. In Fibre Channel, a single ordered set is used for the Idle character in ANSI X3T11.

An output data rate in the FEC clock domain is maintained such that it is much higher then the aggregate data rate of the input data streams. This allows stuffing opportunities for Idle characters and proprietary data across the link. This enables mapping of data streams with +/−100 ppm variation to the same clock domain.

Transported data recovered at the far end of the network must be mapped to the client clock domain. A fixed oscillator is selected for the clock output to the client to maintain low jitter and output clock characteristics that are within the physical layer specifications. This fixed data rate may be +/−100 ppm from the center frequency (1.25 Gbps for Ethernet, 1.0625 Gbps for FC, and 2.125 Gbps for 2FC). Therefore, there may be a mismatch between the data arriving from the Ingress path across the network to the Egress clock domain. As before, Idle 2 characters may be added or removed to match the input data rate to the fixed oscillator that generates the output signal to the client.

In the past, transparency has been difficult to achieve because the data stream timing variations required large amounts of buffering. There are physical limits to the size of the buffers when used in data path devices such as field programmable gate arrays (FPGAs). When data is passing through FPGAs at high data rates (greater than 155 megabits per second), often data tends to overflow the buffers. This method of addition and removal of Idle 2 characters from the data stream in order to align the input and output clocks maintains 10b transparency without overflowing the buffers.

In the prior art, aggregation of packet-based data streams is achieved by encapsulating in SONET, GFP, or other framing protocol. The Ethernet data is often decoded to 8b and then encapsulated prior to transport, which may affect transparency. This method of sending Ethernet and Fibre Channel in its native format reduces costs since this can be done cost effectively in an FPGA and alleviates the need for more expensive ASIC.

Several prior art inventions have attempted to maintain transparency with varying success.

U.S. Pat. No. 6,151,334 to Kim, et al., entitled SYSTEM AND METHOD FOR SENDING MULTIPLE DATA SIGNALS OVER A SERIAL LINK, discloses a method and system for sending multiple data signals over a serial link that uses an embedding unit to encode data streams and then merge the encoded data into a serial stream that is output across a serial line to a removing unit. The removing unit receives the serial steam of data, decodes the serial stream and separates the decoded serial stream into separate streams and reconstructing the input streams. The encoding and transmission are transparent, but are not packet-based streams like Ethernet. The invention of Kim only moves data in time with respect to a radio synchronization signal, but does not address problems with packet based data transparency.

United States Patent Publication No. 2002/0080809 to Nicholson, et al., entitled SYSTEM AND METHOD FOR MULTIPLEXING SYNCHRONOUS DIGITAL DATA STREAMS, discloses a method and system for multiplexing synchronous parallel digital data streams with different clock frequencies into a single data stream while preserving each data stream's timing integrity. Digital data inputs and separate corresponding clock inputs are coupled to corresponding first-in-first-out (FIFOs) buffering. Additionally, clock inputs are coupled to a clock multiplexer (MUX). Nicholson does not address problems arising from packet based data streams that are not synchronous.

United States Patent Publication No. 2002/0075903 to Hind, entitled MULTIPLEXING SONET/SDH DATA STREAMS USING INDEPENDENT ENCODING SCHEMES, discloses a system and method for transparently multiplexing/demultiplexing synchronous data streams without pointer processing or protocol conversion. The system uses encoding schemes to enable recovery of the respective data streams from the aggregate data stream. However, in Hind the synchronous data streams must all have the same bit rate. Hind does not address or solve the problems arising from multiple packet based data streams that have different clock domains.

U.S. Pat. No. 6,396,853 to Humphrey et al., entitled PROVIDING DATA SERVICES TO TELECOMMUNICATIONS USER TERMINALS, discloses a method of multiplexing one or more plesiochronous packet data channels together with lower priority asynchronous traffic into a single composite data stream. The plesiochronous data packets each comprise a number of bytes together with a header element containing channel identification information and a packet length indicator. In Humphrey, et al., the frames are not transparent and, moreover, Humphrey does not address or solve the problems of transparent transportation of packet based data streams that have different clock domains.

Therefore, a need exists for a system to aggregate packet based data streams on to one high-speed optical path in order to achieve transparency and preserve user data wherein the data is produced identically across the network. It is, therefore, desirable to provide a method and apparatus that permits a plurality of low-speed data streams to be multiplexed onto a high-speed data channel.

SUMMARY OF INVENTION

The invention provides an apparatus and method for transparently multiplexing up to 8 Gigabit Ethernet (GBE) data streams; 8 Gigabit Fibre Channel (GFC) data streams; or 4 two Gigabit Fibre Channel (2GFC) data streams over a 10 Gbps optical transport link. Columns 1, 2 and 3 of Table I define the input data format. In the preferred embodiment, four Gigabit Ethernet channels; or four Gigabit Fibre Channels; or 4 two Gigabit Fibre Channels implementations are as shown in the first 3 rows of Table 1. Transparent aggregation of 8b/10b encoded data streams and synchronization of input and output clocks via Idle character addition or removal is described.

| Data Type | Data Rate (Gbps) | Encoding | Channels | Total (Gbps) | FEC Rate (Gbps) | Line Rate (Gbps) |
| --- | --- | --- | --- | --- | --- | --- |
| GBE | 1.25 | 10b | 4 | 6 | 10 | 12.5 |
| GFC | 1.0625 | 8b | 4 | 3.2 | 9.95 | 12.5 |
| 2GFC | 2.125 | 8b | 4 | 6.4 | 9.95 | 12.5 |
| GBE | 1.25 | 10b | 8 | 10 | 10+ | 12.5+ |
| FC | 1.0625 | 8b | 8 | 6.4 | 10 | 12.5 |

In the present invention, multiple packet-based data streams (column 4) are aggregated onto an independent clock source (column 6: 16 bits×622.08 MHz=9.953 Gbps) through the "stuffing" of Idle and Status bits. The independent clock is selected such that the output data rate (column 6) is greater than the composite input data rate (column 5) of all the individual data streams. The independent clock prevents buffer overflow and provides an opportunity to embed Status information into the data.

The resulting signal is encapsulated with forward error correction (FEC) at the transport interface, serialized, and modulated across the transport system. The FEC provides for correction of errors caused due to data impairments in the transport system.

The FEC also provides a reciprocal 16-bit SFI-4 interface that allows mapping of individual data streams to individual bits of the FEC interface. For example, the Gigabit Ethernet data stream arrives as 10-bit wide data at 125 MHz or 1.25 Gbps. The FEC has a 16-bit interface at a clock rate of 625 MHz to accommodate a date rate of 10 Gbps. Therefore, each Gigabit Ethernet data stream may be mapped to 2 bits of the FEC [# bits=(FEC data rate/GBE data rate)×# bits]. Therefore, up to 8 data streams may be mapped to the FEC. The encoded data arrives at the same two bit positions at the far end of the network since the interface is reciprocal. This method enables transmission of data in its native format without encoding channel ID or other wrapper.

An egress circuit at the receiving end recovers the modulated signal and inputs it into a FEC circuit that corrects errors in the transmission. The egress circuit extracts the Status information resulting in a return of the original data frames. The output timing is derived from a fixed oscillator. The Egress circuit maps the input timing to the output timing via the addition/subtraction of Idle characters. In this manner, the packet data is reproduced identical to the incident signal at the ingress path, ensuring the data is identical in content and disparity.

One advantage of the invention is transparent data communication of packet-based data over the transport system.

Another advantage is having two or more sets of signals aggregated into one optical fiber data stream. Without aggregation, the two or more set of signals would each have to be independently transported over the network at a higher cost.

Another advantage is that the input signals do not require a common timing source. In other words, many different users can all use the same system without the need for clock synchronization.

Still another advantage of the current invention is that packet-based data in many variations can be transported transparently. Different users can transport different packet based data. Compatibility adds to the flexibility of the system and reduces overall cost to the user.

Yet another advantage is integrated error correction for each data stream. Instead of required error correction for each signal, only error correction for a combined signal is required. Overall system cost is reduced and efficiency is increased.

BRIEF DESCRIPTION OF THE DRAWINGS

A better understanding of the invention can be obtained from the following detailed description of one exemplary embodiment when considered in conjunction with the following drawings in which:

FIG. 2 is a block diagram depicting an ingress circuit according to the preferred embodiment of the present invention.

DETAILED DESCRIPTION OF THE PREFERRED EMBODIMENT

Figure 1:
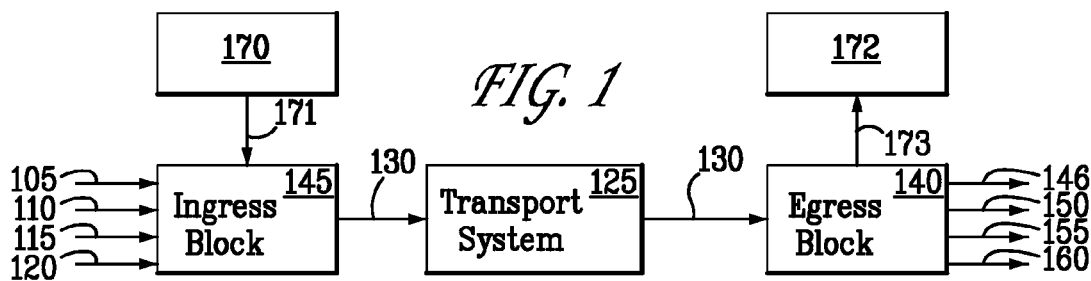
FIG. 1 is a block diagram depicting a transport system for the aggregation of packet-based plesiochronous signals according to the preferred embodiment of the present invention.

FIG. 1 shows a block diagram of the transport system for aggregation and transportation of packet-based data formats 100. System 100 is a fall duplex transport system, the circuits used for aggregation and recovery at both ends of the network are mirror images.

In the preferred embodiment, four independent 10b encoded Gigabit Ethernet data streams 105, 110, 115, and 120 are aggregated by ingress block 145 and transported across transport system 125 in a composite stream 130. Greater (up to 8) or fewer data streams may be accommodated in alternate embodiments by scaling the disclosed components. Other packet based formats such as Gigabit Fibre Channel or FICON that are at data rates of 1.0625 Gbps can be accommodated. Alternately, up to four 2 Gigabit Fibre Channel data streams that are at data rates of 2.125 Gbps can also be accommodated. At ingress block 145, there is a timing uncertainty of approximately +/100 parts per million (ppm) from the received nominal GBE of 1.25 Gbps from each data stream. The timing uncertainty is tracked and corrected in the ingress block 145. Preferably, composite stream 130 has a faster line clock rate greater than 400 ppm faster than the combined input data rate of the data streams. The fast line clock rate prevents buffer overflow and ensures there are stuffing opportunities between packets to embed Idle characters and Status information. In order to increase the clock rate, data bytes are added or "stuffed" between packets in the ingress block 145. The result is that composite stream 130 contains a serial stream that is comprised of 16 data bits serialized in SerDes 254. In the preferred embodiment, each GBE channel is mapped to 4 of the 16 bits of the composite data stream 130. However, it is possible to map each data stream to 2 of the 16 bits thus aggregating 8 channels. Alternately, it is possible to map four 2 GFC channels with each 2 GFC mapped to 4 bits.

Composite stream 130 is transported across transport system 125 to egress block 140. Egress block 140 removes the stuffed data from composite stream 130 and maps the data to a fixed clock rate of 1.25 Gbps for each GBE data stream. A fixed oscillator 680 (described in detail in reference to FIG. 6) in egress block 140 is implemented to clock the received GBE channels for each data stream. The recovered data for data streams 146, 150, 155, and 160 is identical to the Ingress path received data 105, 110, 115, and 120. Thereby multiple packet-based data streams are transparently transported over transport system 125.

Processor 170 connected to ingress block 145 can add user data to a stuffing word through line 171. Downstream processor 172 through line 173 connected to egress block 140 reads the user data.

Referring to FIG. 2, a block diagram of the preferred embodiment of ingress block 145 is shown in greater detail. The ingress path consists of four optical transceivers 1200, each capable of receiving a single Gigabit Ethernet data stream 105, 110, 115, and 120. In the preferred embodiment, each optical transceiver 200 is a small form-factor pluggable (SFP) optical transceiver. The four GBE data streams are converted into electrical output signals 210, and 216 by optical transceivers 200. Electrical output signals 210, 212, 214, and 216 are transmitted to Serializer/Deserializer (SerDes) 218. SerDes 218 receives electrical output signals 210, 212, 214, and 216 from the optical transceivers 200 and generates recovered GBE clock 220, 222, 224 and 226; and 10b encoded GBE data 228 230 232 and 234. Alternately, in the case of Fibre Channel, the SerDes may contain an encoder/decoder block to provide the data in 8b format.

System clock 258 is a GBE reference clock that is used to generate the 125 MHz SerDes reference signal; the 625 MHz line rate signal; and also as a clock for the recovered Egress signals to the client interface. In the preferred embodiment, a 125 MHz signal is generated as the SerDes and FPGA clocks. The SerDes uses the clock as a reference to recover input signal. The Ingress FPGA uses it to generate the 625 MHz line rate to the FEC. The Egress FPGA uses it to clock recovered data back to the client. This does not preclude use of a 106.25 MHz or other clock to generate 1 G and 2 G Fibre Channel signals.

Recovered GBE clock signals 220, 222, 224, and 226 with nominal frequency of 125 MHz for GBE; and 10b encoded data signals 228, 230, 232, and 234, are transmitted from SerDes 218 to Ingress field programmable gate array (FPGA) 244 where data signals 228, 230, 232, and 234 are processed into composite signal 246 as discussed below. Line clock rate signal 262 is also transmitted to FPGA 244. Composite signal 246 is comprised of n×625 MHz parallel signals governed by the line clock rate signal 262. In the preferred embodiment n is 16 and each GBE, 1GFC, or 2G FC is mapped to 4 of the 16 FEC channels. However, n can be as low as 2 where each GBE is mapped to 2 of the 16 FEC channels thus accomplishing 8 GBE channel aggregation. In the preferred embodiment, a 625 MHz clock is used for aggregating the individual data streams. However, alternate clock rates of 100 MHz to 810 MHz may be used depending on the application. The only restriction is that the output data rate must be greater than the aggregate input data rate as described earlier.

Composite signal 246 is received by ingress FEC 248 and processed into transport composite signal 256. Composite signal 256 contains 16 parallel FEC output signals at the faster line clock rate. As is known in the art, the FEC output signals contain both the data and the input clock encapsulated in the FEC code. When the receiving FEC performs error correction on the signal, both the data and clock are recovered by a method know in the art as "through timing".

Transport composite signal 256 is transmitted to SerDes 254. SerDes 254 serializes transport composite signal 256 into composite stream 130 comprised of a single bit wide channel at the fast clock rate of nominal speed of 12.5 Gbps. SerDes 254 transmits composite stream 130 to transport system 125 for transmission.

Figure 3:
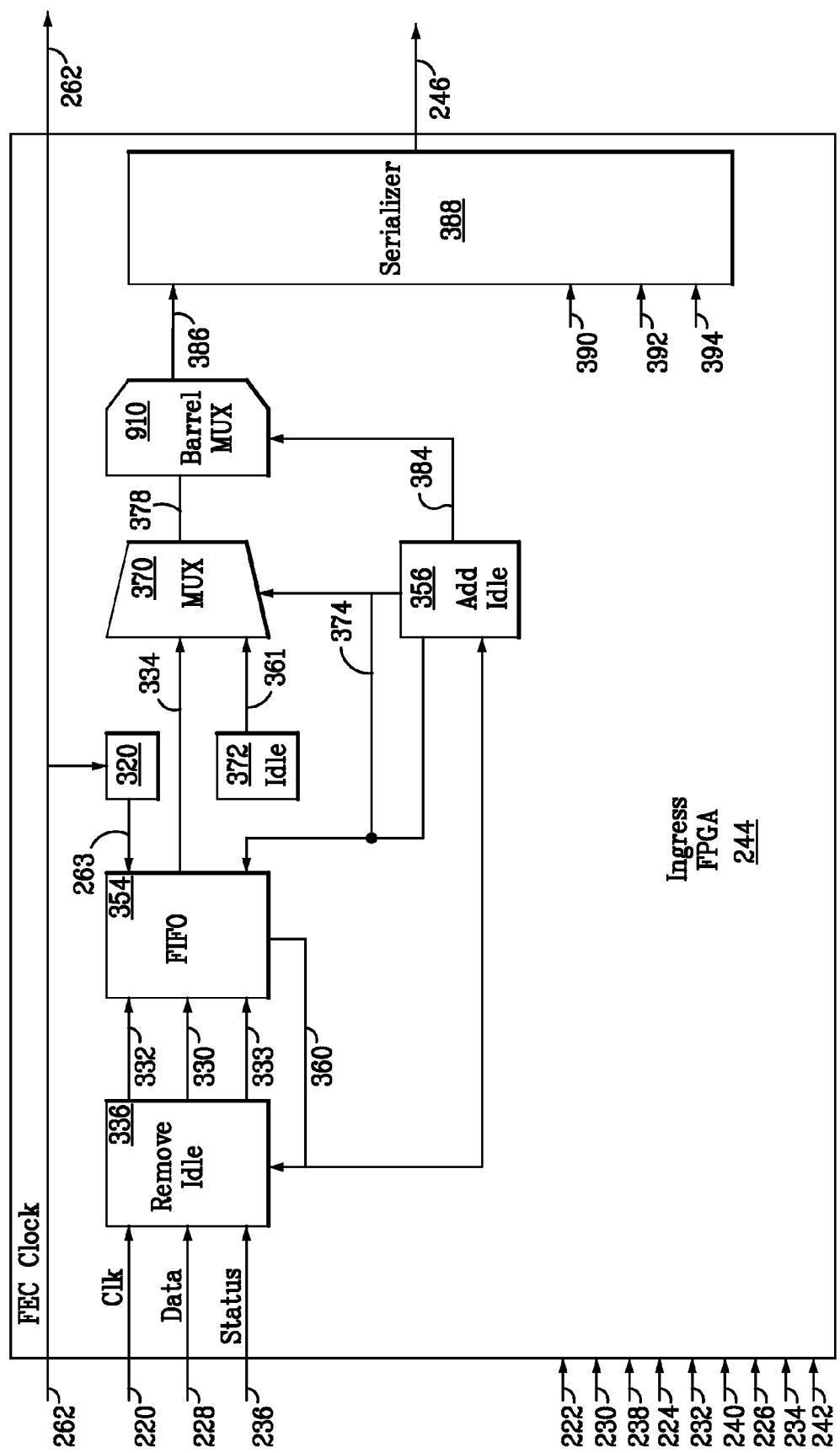
FIG. 3 is a block diagram depicting an ingress field programmable gate array according to the preferred embodiment of the present invention.

FIG. 3 is a block diagram showing a portion of the preferred embodiment of ingress FPGA 244 in greater detail. Ingress FPGA 244 receives recovered GBE or FC clock signals 220, 222, 224, and 226, data signals 228, 230, 232, and 234, transmitted from SerDes 218 (FIG. 2). Ingress FPGA 244 receives signal present status signals 236, 238, 240, and 242 transmit from optical transceivers 200 (FIG. 2). Signal present status signal 236 is sent to remove idle controller 336. GBE or FC clock signal 220 and data signal 228 are sent to remove idle controller 336. In the preferred embodiment, data signal 228 is at a rate of 125 MHz 10 bits wide (1 Ob) for GBE or 106.25 MHz 10 bits wide (8 bits data (8b)+1 control bit+1 status bit) for FC. Each GBE or FC clock signal 220, 222, 224, and 226 is plesiochronous to the other GBE or FC clock signals 220, 222, 224, and 226.

Remove idle controller 336 recognizes idles (GBE idle2 or FC idle order set). It will remove an idle when the FIFO depth status signal 360 indicates the FIFO depth reaches a maximum threshold. The FIFO buffer depth has a programmable threshold range with a requirement that the maximum threshold be set greater than the minimum threshold. The maximum threshold has a range from 10 to 90%. The preferred maximum threshold is 75% of the total FIFO depth or (1024× 0.75=768). An idle is removed by turning off the write enable signal 333 to the FIFO circuit 354. The GBE idle 2 is represented by K28.5 followed by D16.2 and the FC idle order set is represented by K28.5 followed by D21.4 followed by D21.5 followed by D21.5 as defined in ANSI X3.230 FC-1. The remove idle controller 336 transmits the 125 MHz clock for GBE or 106.25 MHz clock for FC signal 332 and 330 data stream to first-in/first-out buffer (FIFO) 354.

Clock Divider 320 converts the FEC clock a 625 MHz clock signal 262 into a 156.25 MHz clock signal 263 to the FIFO.

Preferably, FIFO 354 is a 1024 deep by 10 bits wide dual port, dual clock domain FIFO. FIFO 354 outputs aligned fast data signal 334 to multiplexer (MUX) 370. Aligned fast data signal 334 is synchronized to faster line clock rate signal 263 via clock divider circuit 320-output signal 263. The FIFO 354 is written to at a maximum rate of 10 bits at 125 MHz or 1.25 M Bits/Second in the case of GBE and 10 bits at 106.25 MHz or 1.0625 M Bits/Second in the case of FC. The FIFO 354 is read at a maximum rate of 10 bits at 80% of 156 MHz or 1.25 M Bits/Second. At least every 5th clock the FIFO read is skipped to allow the barrel MUX 910 to convert the 10 bit data 378 into 8 bit data 386. Occasionally more FIFO reads will be skipped if idles need to be inserted to adjust ingress timing.

It should be noted that the remove idle function is not necessary when FC is transported. This is due to the fact that the data rate coming into the FIFO will always be slower than the rate the FIFO is being read. The max rate of FIFO write is 10 bits at 106.25 MHz the max FIFO read is 10 bits at 80% of 156.25 MHz. (FIFO read is skipped every 5 clocks). As is required, 1.0625 M Bits /Sec is less than 1.25 M Bits/Sec.

Add idle controller 356 coordinates the processes necessary to add GBE or FC idles between frames and adjust timing of the ingress circuit. Add idle controller 356 calculates the number of idles needed to adjust timing and transmits this number of idles to MUX 370. It also calculates the necessary advancement of barrel MUX 910 to properly align the output signal via the control signal 384. The add idle controller 356 will add idles when the FIFO depth status signal 360 indicates the FIFO depth falls below a minimum threshold. The FIFO buffer depth has a programmable threshold range with a requirement that the minimum threshold be set less than the maximum threshold. The minimum threshold has a range from 10 to 90%. The preferred minimum threshold is 25% of the total FIFO depth or (1024×0.25=256). The add idle controller 356 adds idles by selecting idle data signal 378 from the idle data logic 361 via the MUX select signal 374. The MUX select signal 374 also, controls the read of the FIFO circuit 354.

Idle data logic 372 transmits the idle data signal 361 to the MUX 372. MUX 370 will pass through the data signal 334 or data signal 361 to the barrel MUX 910 via data signal 378 depending on the MUX select signal 374 transmitted by the add idle controller 356.

Figure 8:
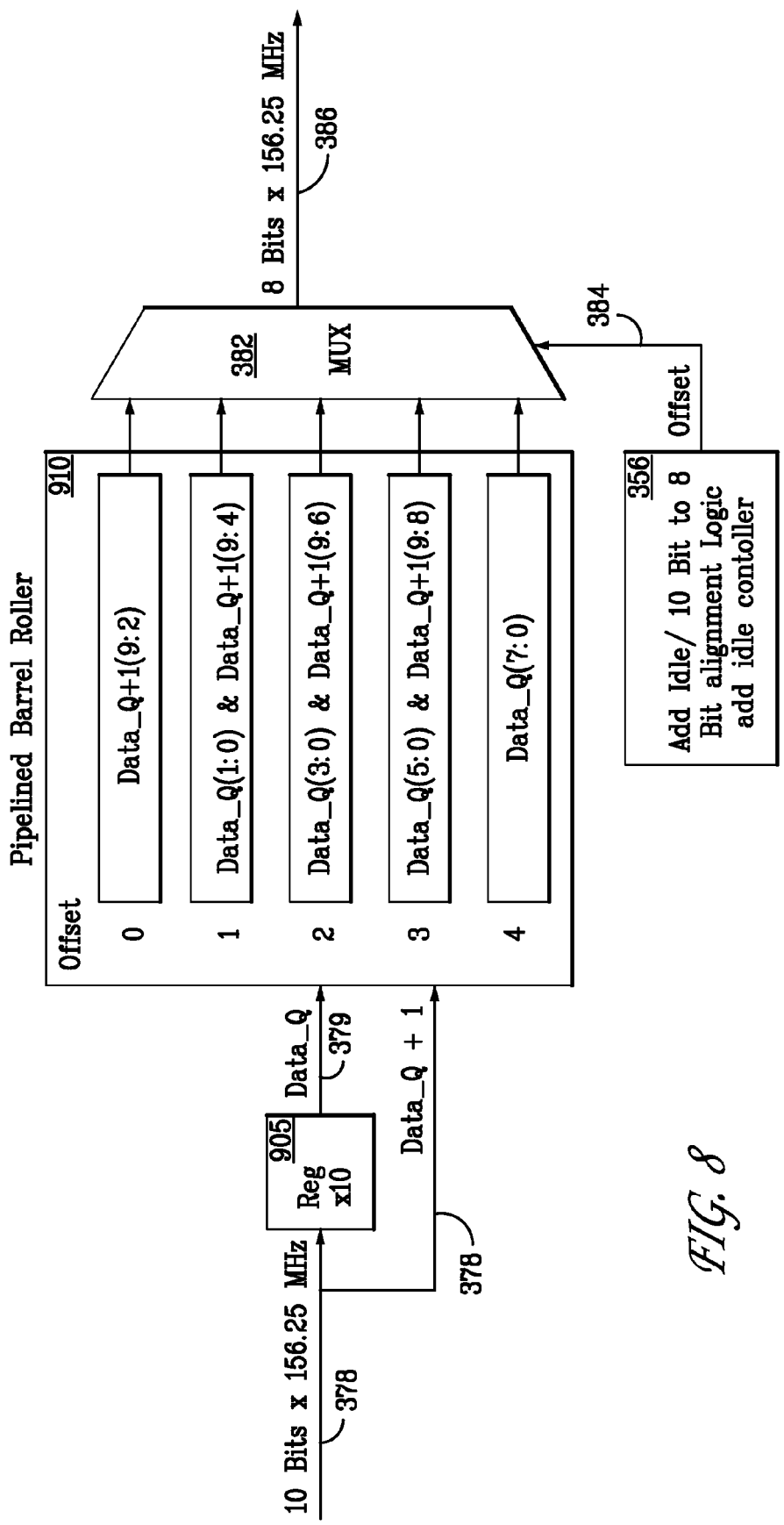
FIG. 8 is a block diagram depicting a pipeline barrel roller MUX according to the preferred embodiment of the present invention.

Pipeline barrel roller MUX 910 is shown in FIG. 8. Pipeline barrel roller MUX 910 is used to convert the 10 bit data 378 into 8 bit data 386. Combined word signal 378 enters pipeline barrel roller MUX 910 and is 10 bits wide at 156.25 MHz. Signal 378 enters register 905, which is a register 10 bits wide. Signal 378 is also shunted to the input of pipeline barrel roller MUX 910. Register 905 delays signal 378 by a single clock tick resulting in delayed signal 379. Pipeline barrel roller 910 allows the data from register 905 to be shifted in time by 0 to 10 bits in 2 bit increments according to an offset signal 384 from add idle controller 356. Once shifted, the data is released through MUX 382. For example, if offset signal 384 is 0, the data is shifted 2 bits MUX 382 passes bits 9 through 2 of signal 378 to signal 386. If offset signal 384 is set to 1, the data is shifted 4 bits. MUX 382 then releases bits 1 through 0 from register 905 and bits 9 through 4 of signal 378 to signal 386. If offset 2 is selected on line 384, data bits 3 through 0 from register 905 and bits 9 through 6 of signal 378 will be passed to signal 386. If offset 3 is selected on line 384, data bits 5 through 0 from register 905 and bits 9 through 8 of signal 378 will be passed to signal 386. If offset 4 is selected on line 384, data bits 7 through 0 from register 905 will be passed without being shifted to signal 386.

Returning to FIG. 3, signal 386 is an 8 bit×156.25 MHz signal and is transmitted from pipeline barrel roller MUX 910 to Serializer 388. Second group of signals 222, 230 and 238, third group of signals 224, 232 and 240, fourth group of signals 226, 234 and 242, proceed along an analogous path through a parallel and duplicative set of devices to achieve signals analogous to signal 386 produced from first group of signals. Second group of signals produce signal 390. Third group of signals produce signal 392. Fourth group of signals produce signal 394. Signal 386 and signals 390, 392 and 394 are transmitted to Serializer 388. Serializer 388 serializes the 8×156.25 MHz signals 386, 390, 392, and 394 into four 2×625 MHz signals, creating a 8×625 MHz composite signal 246. By adding idles when and if needed the add idle controller 356 ensures that all of the data streams are outputted at a common clock rate. As shown in FIG. 2. composite signal 246 emerges and is transmitted to FEC 248 as an 8 bit×625 MHz signal. In the case of 8 GBE or 8 1 Gig FC the composite signal 246 will be a 16 bit×625 MHz signal.

Figure 7:
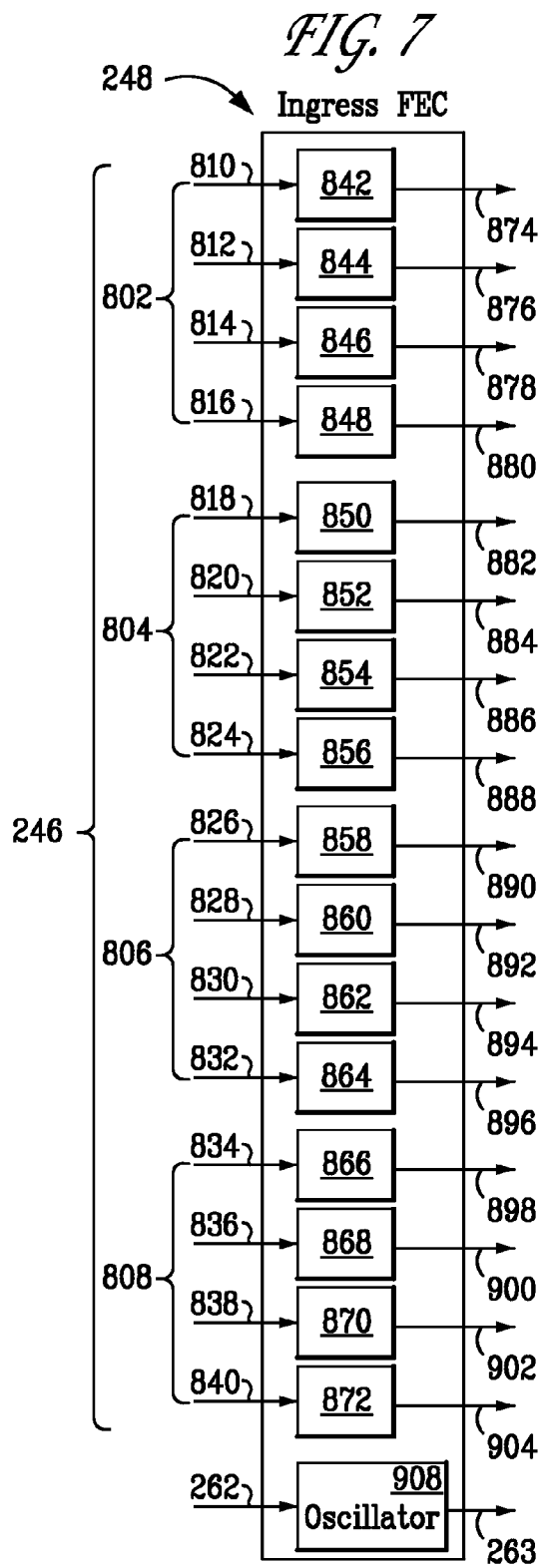
FIG. 7 is a block diagram depicting a forward error correction system according to the ingress block of the preferred embodiment of the present invention.

FEC 248 of FIG. 2 is shown in FIG. 7 as FEC 248 and its functions will be described with respect to FIG. 7. FEC 248 assigns each outputted data stream in composite signal 246 to one of four FEC lanes 802, 804, 806, and 808 for transport. FEC 248 has a 16-bit SFI-4 interface running at 625 MHz clock rate to match the output of ingress FPGA 244. Ports 842-872 in FEC 248 act as 16 independent serial data ports. Assigning 4 FEC lanes 802, 804, 806, and 808 to GBE or FC stream 246 may map any format data mapped to any combination of transport channels to achieve serial communications without embedding control codes for channel identification. FEC 248 encapsulates the data in composite signal 246 mapping it to signals 874-904 providing a 25% overhead error correction code, which provides greater than 9 dB of coding gain. FEC 248 receives signal 262 and passes it through line side oscillator 908 to be reproduced and transmitted as signal 263 (shown in FIG. 2) to SerDes 254 (also shown in FIG. 2). It must be understood that a plurality of clock rates may be specified for use in the operation of the present invention, but clocks rates exacting a ratio of 25% should be maintained in the preferred embodiment. For example, the clock rate for composite signal 246 can be up to 810 MHz and the clock rate for signal 262 can be up to 650 MHz. A plurality of FEC algorithms with overhead ratios up to 25% may be used depending on system requirements.

Figure 5:
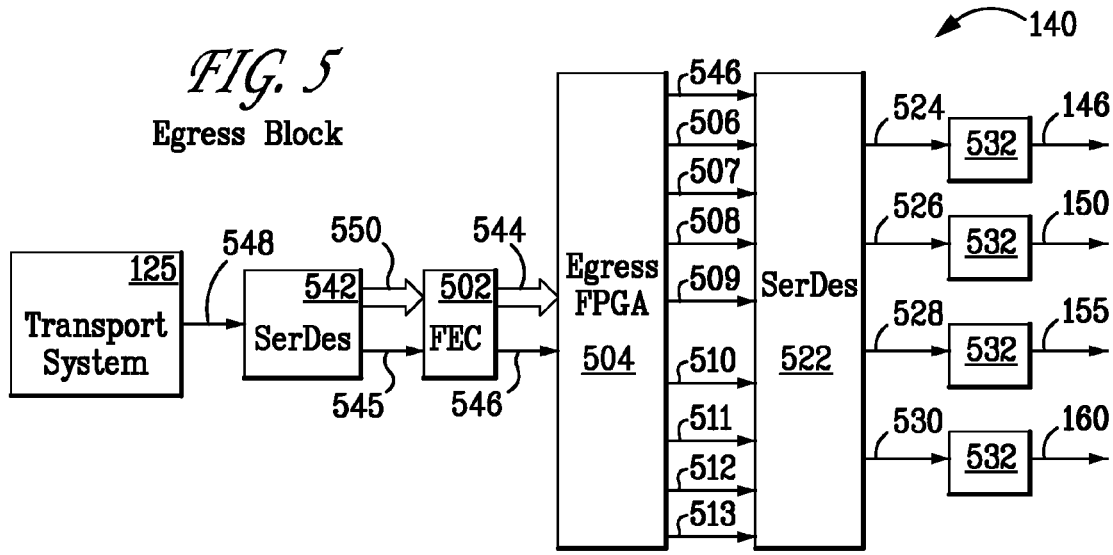
FIG. 5 is a block diagram depicting an egress circuit according to the preferred embodiment of the present invention.

FIG. 5 is a block diagram of the preferred embodiment of egress block 140 shown in greater detail. Incoming signal 548 is 1 bit wide 12.5 Gigabit per second optical signal at the aggregated transport rate. SerDes 542 deserializes composite signal 548 into 16-bit FEC encoded data signal 550, at a clock rate of 781.25 MHz, and transmits deserialized signal 550 to FEC 502. SerDes 542 also recovers clock signal 545, which is at a rate of 781.25 MHz and transmits it to FEC 502. FEC 502 performs error correction on deserialized signal 550 and recovers composite data signal 544 and composite 625 MHz clock signal 546. Composite clock signal 546 is at the 625 MHz clock rate of the ingress block and is 16 to data bits wide. Composite data signal 544 and composite clock signal 546 are transmitted to egress FPGA 504 for data stream and timing extraction.

Figure 9:
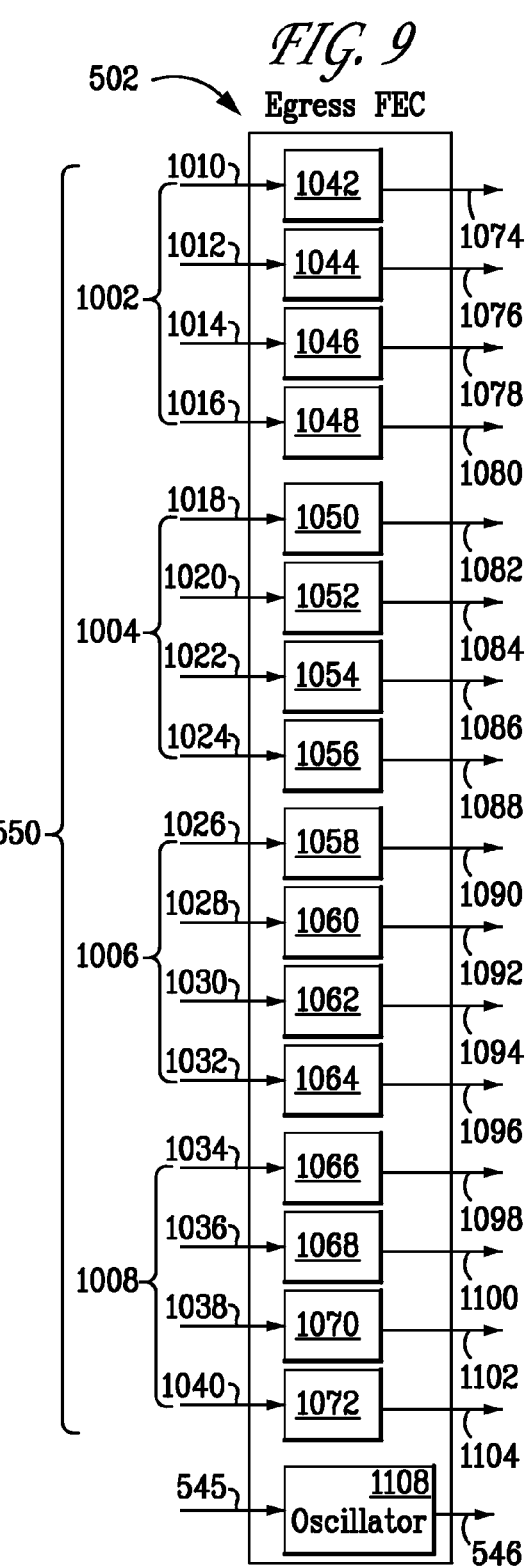
FIG. 9 is a block diagram depicting a forward error correction system according to the egress block of the preferred embodiment of the invention.

The structure and function of FEC 502 is shown and described in reference to FIG. 9. FEC 502 assigns each output of data stream in composite signal 550 to one of four FEC lanes, 1002, 1004, 1006 and 1008, for decoding. FEC 502 has a 16-bit SFI 4 interface running at 625. MHz clock rate to match the output of SerDes 542. Ports 1042 through 1072 in FEC 502 act as sixteen independent serial data ports. Thus, FEC 502 strips the error correction from the encapsulated data in composite signal 550, mapping it to signals 1074-1104, extracting the 25% overhead error correction code to obtain the 9 decibels of coding gain. FEC 502 receives 781.25 MHz clock signal 545, passes it through oscillator 1108 to reproduce 625 MHz clock signal 546.

Referring again to FIG. 5, Egress FPGA 504 re-clocks the signal and transmits four synchronous GBE or FC channels 506, 508, 510, and 512 to SerDes 522 as 10 bit wide (10b) 125

MHz data clocked signals for GBE or 10 bit wide (8 b+1 control bit+status bit) 106.25 MHz wide for Fibre Channel (FC). Alternatively, if 8 synchronous GBE or FC channels were transmitted, channels 507, 509, 511, and 513 may be used in addition to channels 506, 508, 510, and 512.

SerDes 522 serializes synchronous GBE or FC channels 506, 508, 510, and 512 which are each 125 MHz for GBE or 106.25 MHz for FC signals, and transmits four synchronous GBE or FC data streams 524, 526, 528, and 530 which are 1 bit wide 1.25 GHz for GBE or 1.0625 GHz for FC signals containing the same data as the four input synchronous GBE or FC data streams 105, 110, 115, and 120 (FIG. 1) to SFP optical transceiver 532. SFP Optical transceiver 532 converts the electrical synchronous GBE or FC data streams 524, 526, 528, and 530 to optical outputted synchronous GBE or FC data streams 146, 150, 155, and 160.

Figure 6:
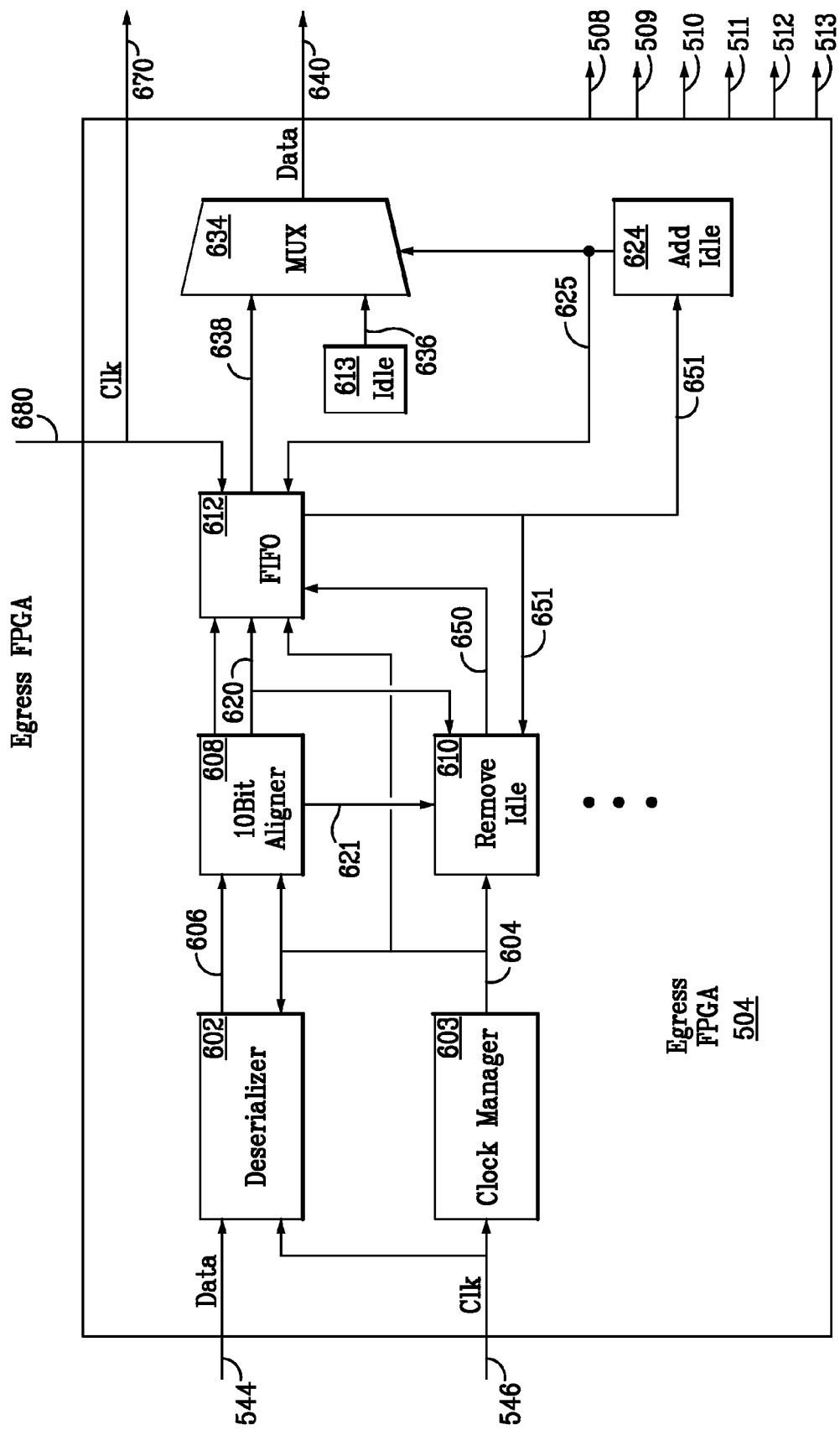
FIG. 6 is a block diagram depicting an egress field programmable gate array according to the preferred embodiment of the present invention.

FIG. 6 is a block diagram showing the preferred embodiment of egress FPGA 504 in greater detail. Deserializer 602 deserializes composite signal 544 from a 2×625 MHz signal into an 8×156.25 MHz deserialized signal 606. Deserialized signal 606 is transmitted from Deserializer 602 to 10 bit aligner circuit 608. Composite clock signal 546 runs at 625 MHz and is connected to clock manager 603 where it is converted into a 156.25 MHz clock signal 604. Clock signal 604 is connected to Deserializer 602 and 10 bit aligner circuit 608 and remove idle controller and the input side of FIFO 612.

Figure 4:
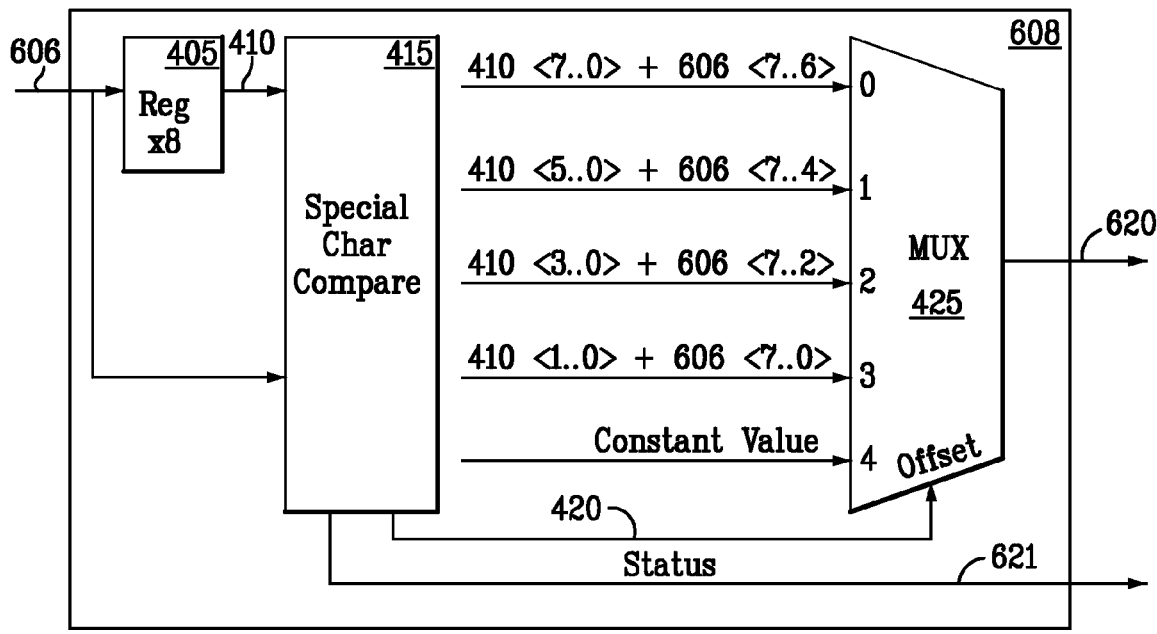
FIG. 4 is a block diagram depicting the 10-bit aligner circuit according to the preferred embodiment of the present invention.

FIG. 4 is a block diagram showing the preferred embodiment of the 10 bit aligner circuit 608 from FIG. 6 and is shown in greater detail. The 10-bit aligner circuit 608 is used to convert the 8 bit data 606 into 10 bit data 620. The signal 606 enters the 10-bit aligner circuit 608 and is 8 bits wide at 156.25 MHz. Signal 606 enters register 405, which is a register 8 bits wide. Signal 606 is also shunted to the input of the special character compare 415. Register 405 delays signal 606 by a single clock tick resulting in delayed signal 410. The 10-bit aligner circuit 608 allows the combined 16 bits data stream of 606 and 410 to be multiplexed by MUX 425 into a single 10-bit data stream 620. For example if the special character (K28.5) is detected on data bits 7 to 0 of signal 410 and data bits 7 to 6 of signal 606 the offset signal 420 will be reset to 0. If the special character (K28.5) is detected on data bits 5 to 0 of signal 410 and data bits 7 to 4 of signal 606 the offset signal 420 will be reset to 1. If the special character (K28.5) is detected on data bits 3 to 0 of signal 410 and data bits 7 to 2 of signal 606 the offset signal 420 will be reset to 2. If the special character (K28.5) is detected on data bits 1 to 0 of signal 410 and data bits 7 to 0 of signal 606 the offset signal 420 will be reset to 3. The offset is incremented after every clock once the special character (K28.5) is detected by the special character compare 415. A shifted 10-bit data word is passed through to signal c620 when the offset signal 420 equals 0, 1, 2, or 3. When the offset signal 420 equals 4 a constant filler value is sent to signal 620 and the FIFO write enable signal is turned off to FIFO 612. The 10-bit data aligner transmits an alignment status signal to remove idle controller 610 when the special character (K28.5) is detected.

Referring again to FIG. 6, the remove idle circuit 610 recognizes and removes idles from each stream in the same process as described with respect to remove idle circuit 336 of the Ingress FPGA (FIG. 3). The remove idle circuit 610 uses the alignment status signal 621 and the FIFO depth status signal 651 from the FIFO circuit 612 to control the FIFO write signal 650.

The add idle circuit 624 recognizes and adds idles to the data stream 640 in the same process as described with respect to add idle circuit 356 (shown in FIG. 3). The add idle circuit 624 uses the FIFO depth status signal 651 from the FIFO circuit 612 to control the FIFO read signal 625. The FIFO read signal 625 also serves as select control to MUX 634.

The MUX circuit 634 will pass through the FIFO 10 bit output data stream 638 or the output signal 636 of the idle logic 613 to the 10-bit data stream 640 based on the value of the select control signal 625. The idle logic 613 will transmit the appropriate GBE idle2 or FC idle ordered set.

Preferably, FIFO 612 is a 1024 deep by 10 bits wide dual port, dual clock domain FIFO. FIFO 612 outputs aligned slow data signal 612 to multiplexer (MUX) 634. Aligned slow data signal 638 is synchronized to slower line clock rate signal 680. The FIFO 612 is written to at a maximum rate of 10 bits at 80% of 156 MHz or 1.25 M Bits/Second. At least every 5th clock the FIFO write is skipped to allow the 10-bit aligner 608 to convert the 8 bit data 606 into 10 bit data 620. The FIFO 612 is read at a maximum rate of 10 bits at 125 MHz or 1.25 M Bits/Second in the case of GBE and 10 bits at 106.25 MHz or 1.0625 M Bits/Second in the case of FC. Occasionally more FIFO reads will be skipped if idles need to be inserted to adjust egress timing. The egress FPGA 600 transmits the 125 MHz GBE clock or 106.25 MHz clock signal 670 to SerDes 522 of FIG. 5.

Egress FIFO 612 transmits output signal 638 to MUX 634. Output signal 638 is a 10×125 MHz GBE signal or 10 bit 106.25 MHz FC signal. MUX 634 is used to transmit data from the FIFO 612 or added idles from idle logic 613. Output signal 640 is a 10 bit (10b)×125 MHz GBE or 10 bit (8b+1 control bit+1 status bit)×106.25 MHz FC. Channel 640 is sent to SerDes 522 (FIG. 5) and is analogous to signal 506.

The structure and function of components described with respect to signal 544 are duplicated for signals 545, 547, and 548 resulting in signals 508, 509, 510, 511, 512, and 513 which are sent to SerDes 522.

Although the invention has been described with reference to one or more preferred embodiments, this description is not to be construed in a limiting sense. For example the method and apparatus can be used to aggregate and transparently transport a variety of formats and is not limited to Gigabit Ethernet, Fibre Channel, and FICON formats. There is modification of the disclosed embodiments, as well as alternative embodiments of this invention, which will be apparent to persons of ordinary skill in the art, and the invention shall be viewed as limited only by reference to the following claims.

The invention claimed is:

1. A system for aggregating and transporting packet-based data, the system comprising:
    an ingress stream block configured to receive and aggregate a plurality of packet-based data streams, in a native mode, to produce a composite packet-based data stream, wherein the ingress stream block comprises:
        a first transceiver configured to convert a first packet-based data stream of the plurality of packet-based data streams to a first electrical signal;
        a second transceiver configured to convert a second packet-based data stream of the plurality of packet-based data streams to a second electrical signal;
        a first serializer/deserializer configured to generate a first recovered clock signal and a first encoded data signal from the first electrical signal and generate a second recovered clock signal and a second encoded data signal from the second electrical signal, wherein the first recovered clock signal comprises a Gigabit Ethernet recovered clock signal and the first encoded data signal comprises a Gigabit Ethernet data signal;

a first field programmable gate array configured to aggregate the first and second encoded data signals, using a clock signal, to produce an intermediate composite signal;

a first forward error correction component configured to encapsulate the intermediate composite signal to produce a first encapsulated composite signal; and a second serializer/deserializer configured to serialize the encapsulated composite signal to produce the composite packet-based data stream;

an optical transport coupled to the ingress stream block, wherein the optical transport is configured to transport the composite packet-based data stream; and an egress stream block coupled to the optical transport, wherein the egress stream block is configured to receive the composite packet-based data stream and to recover the plurality of packet-based data streams therefrom.

2. The system of claim 1 wherein the clock rate is approximately 625 MHz.

3. The system of claim 1 wherein the egress stream block comprises a third serializer/deserializer configured to deserialize the composite packet-based data stream to produce a deserialized signal.

4. The system of claim 3 wherein the egress stream block further comprises a second forward error correction component configured to recover the intermediate composite signal from the deserialized signal.

5. The system of claim 4 wherein the egress stream block further comprises a second field programmable gate array configured to re-clock the intermediate composite signal to produce the first encoded data signal and the second encoded data signal.

6. The system of claim 5 wherein the egress stream block further comprises a fourth serializer/deserializer configured to serialize the first and second encoded data signals to produce the plurality of packet-based data streams.

7. A system for aggregating and transporting packet-based data, the system comprising:

ingress means for receiving and aggregating a plurality of packet-based data streams, in a native mode, to produce a composite packet-based data stream, wherein the ingress means comprises:

means for converting a first packed-based data stream of the plurality of packet-based data streams to a first electrical signal;

means for converting a second packet-based data stream of the plurality of packet-based data streams to a second electrical signal;

means for generating a first recovered clock signal and a first encoded data signal from the first electrical signal, wherein the first recovered clock signal comprises a Gigabit Ethernet recovered clock signal and the first encoded data signal comprises a Gigabit Ethernet data signal;

means for generating a second recovered clock signal and a second encoded data signal from the second electrical signal;

means for aggregating the first and second encoded data signals, using a clock rate, to produce an intermediate composite signal;

means for encapsulating the intermediate composite signal to produce an encapsulated composite signal; and means for serializing the encapsulated composite signal to produce the composite packet-based data stream;

transport means for transporting the composite packet-based data stream; and egress means for receiving the composite packet-based data stream and for recovering the plurality of packet-based data streams therefrom.

8. The system of claim 7 wherein the clock rate is approximately 625 MHz.

9. The system of claim 7 wherein the egress means comprises means for deserializing the composite packet-based data stream to produce a deserialized signal.

10. The system of claim 9 wherein the egress means comprises means for recovering the intermediate composite signal from the deserialized signal.

11. The system of claim 10 wherein the egress means comprises means for re-clocking the intermediate composite signal to produce the first encoded data signal and the second encoded data signal.

12. The system of claim 11 wherein the egress means comprises means for serializing the first and second encoded data signals to produce the plurality of packet-based data streams.

13. A system for aggregating and transporting packet-based data, the system comprising:

an ingress stream block configured to receive and aggregate a plurality of packet-based data streams, in a native mode, to produce a composite packet-based data stream;

an optical transport coupled to the ingress stream block, wherein the optical transport is configured to transport the composite packet-based data stream; and an egress stream block coupled to the optical transport, wherein the egress stream block is configured to receive the composite packet-based data stream and to recover the plurality of packet-based data streams therefrom, and wherein the egress stream block comprises:

a first serializer/deserializer configured to deserialize the composite packet-based data stream to produce a deserialized signal;

a first forward error correction component configured to recover an intermediate composite signal from the deserialized signal;

a first field programmable gate array configured to re-clock the intermediate composite signal to produce a first encoded data signal and a second encoded data signal wherein the first recovered clock signal comprises a Gigabit Ethernet recovered clock signal and the first encoded data signal comprises a Gigabit Ethernet data signal; and a second serializer/deserializer configured to serialize the first and second encoded data signals to produce the plurality of packet-based data streams.

14. The system of claim 13 wherein the ingress stream block comprises a first transceiver configured to convert a first packet-based data stream of the plurality of packet-based data streams into a first electrical signal, and wherein the ingress stream block further comprises a second transceiver configured to convert a second packet-based data stream of the plurality of packet-based data streams into a second electrical signal.

15. The system of claim 14 wherein the ingress stream block further comprises a third serializer/deserializer configured to generate a first recovered clock signal and the first encoded data signal from the first electrical signal, and wherein the third serializer/deserializer is further configured to generate a second recovered clock signal and the second encoded data signal from the second electrical signal.

16. The system of claim 15 wherein the ingress stream block further comprises a second field programmable gate array configured to aggregate the first and second encoded data signals, using a clock rate, to produce the intermediate composite signal.

17. The system of claim 16 wherein the ingress stream block further comprises a second forward error correction component configured to encapsulate the intermediate composite signal to produce an encapsulated composite signal.

18. The system of claim 17 wherein the ingress stream block further comprises a fourth serializer/deserializer configured to serialize the encapsulated composite signal to produce the composite packet-based data stream.

19. The system of claim 13 wherein the clock rate is approximately 625 MHz.

20. An apparatus for aggregating a plurality of packet-based data streams and transparently transporting the plurality of packet-based data streams over an optical data link, the apparatus comprising:
    a first optical transceiver configured to convert a first packet-based data stream to a first electrical signal;
    a second optical transceiver configured to convert a second packet-based data stream to a second electrical signal;
    a first serializer/deserializer connected to the first and second optical transceivers, wherein the first serializer/deserializer is configured to generate a first encoded data signal and a first recovered clock signal from the first electrical signal and generate a second encoded data signal and a second recovered clock signal from the second electrical signal, wherein the first recovered clock signal comprises a Gigabit Ethernet recovered clock signal and the first encoded data signal comprises a Gigabit Ethernet data signal;
    an aggregation component connected to the first serializer/deserializer, wherein the aggregation component is configured to aggregate the first and second encoded data signals in a native mode, using a clock rate, to produce a composite signal, wherein the aggregation component comprises:
        a remove idle controller connected to the first serializer/deserializer;
        a FIFO circuit connected to the remove idle controller;
        a multiplexer connected to the FIFO circuit;
        a barrel multiplexer connected to the multiplexer; and
        a serializer connected to the barrel multiplexer; and
    a second serializer/deserializer connected to the aggregation component, wherein the second serializer/deserializer is configured to serialize the composite signal for transmission over the optical data link.

21. The apparatus of claim 20 wherein the Gigabit Ethernet recovered clock signal and the Gigabit Ethernet data signal are sent to the remove idle controller.

22. The apparatus of claim 21 wherein the Gigabit Ethernet data signal is at a rate of about 125 MHz and 10b wide.

23. The apparatus of claim 20 wherein the first encoded data signal comprises 8 bits of data, 1 control bit, and 1 status bit.

24. The apparatus of claim 20 wherein the FIFO circuit includes a programmable threshold range, and
    wherein the FIFO circuit further includes a maximum threshold of about 10% to 90% of a FIFO depth.

25. The apparatus of claim 24 wherein the FIFO circuit further includes a minimum threshold, and
    wherein the maximum threshold is about 75% of the FIFO depth and the minimum threshold is about 25% of the FIFO depth.

26. The apparatus of claim 20 wherein the remove idle controller is configured to remove an idle by turning off a write enable signal to the FIFO circuit.

27. The apparatus of claim 20 wherein the remove idle controller is configured to recognize at least one of a Gigabit Ethernet idle 2 order set or a Fibre Channel idle order set.

28. The apparatus of claim 27 wherein the Gigabit Ethernet idle 2 order set is represented by K28.5 followed by D16.2.

29. The apparatus of claim 27 wherein the Fibre Channel idle order set is represented by K28.5 followed by D21.4, followed by D21.5, followed by D21.5, followed by D21.5.

30. The apparatus of claim 20 wherein the aggregation component further comprises a clock divider configured to synchronize an aligned fast data signal from the FIFO circuit to a faster line clock rate signal.

31. The apparatus of claim 20 wherein the FIFO circuit comprises a 1023 deep by 10 bits wide dual port, dual clock domain FIFO.

32. The apparatus of claim 20 wherein the FIFO circuit is written to at a maximum rate of about 10 bits at 1.25 M Bits/Second for Gigabit Ethernet.

33. The apparatus of claim 20 wherein the FIFO circuit is written to at a maximum rate of about 10 bits at 1.0625 M Bits/Second for Fibre Channel.

34. The apparatus of claim 20 wherein the aggregation component further comprises an add idle controller configured to calculate a necessary advancement of the barrel multiplexer.

35. The apparatus of claim 34 wherein the add idle controller is further configured to calculate a number of idles needed to adjust a timing of the aggregation component.

36. The apparatus of claim 20 wherein a FIFO circuit read is skipped at least every 5th clock.

37. The apparatus of claim 36 wherein additional FIFO circuit reads are skipped if idle bits need to be inserted to adjust ingress signal timing.

38. The apparatus of claim 20 wherein the first and second packet-based data streams each comprise one of Gigabit Ethernet data or Fibre Channel data.

39. The apparatus of claim 38 wherein the first serializer/deserializer includes an encoder/decoder block to provide the Fibre Channel data in 8b format.

40. The apparatus of claim 20 wherein the optical data link comprises a 10 Gigabit optical link.

41. The apparatus of claim 20 further comprising a system clock configured to generate a 125 MHz signal, wherein the first serializer/deserializer and the aggregation component are configured to use the 125 MHz signal as a clock.

42. The apparatus of claim 41 wherein the aggregation component is configured to use the 125 MHz signal to generate a 625 MHz line rate to a forward error correction component.

43. The apparatus of claim 41 wherein the first serializer/deserializer is configured to use the 125 MHz signal as a reference to recover an input signal.

44. The apparatus of claim 20 wherein the composite signal comprises N×625 MHz parallel signals governed by a line clock rate signal.

45. The apparatus of claim 44 wherein the composite signal comprises an 8×625 MHz composite signal.

46. The apparatus of claim 20 wherein one of the first or second packet-based data streams comprise 10b-encoded Gigabit Ethernet data.

47. The apparatus of claim 20 wherein one of the first or second packet-based data streams comprise 10b-encoded Fiber Channel data.

48. The apparatus of claim 20 wherein the aggregation component comprises a field programmable gate array.

49. A method for aggregating a plurality of packet-based data streams for transport over an optical transport system, the method comprising:
- receiving a first packet-based data stream of the plurality of packet-based data streams and a second packet-based data stream of the plurality of packet-based data streams;
- converting the first packet-based data stream to a first electrical signal;
- converting the second packet-based data stream to a second electrical signal;
- generating a first encoded data signal and a first recovered clock signal from the first electrical signal, wherein the first recovered clock signal comprises a Gigabit Ethernet recovered clock signal and the first encoded data signal comprises a Gigabit Ethernet data signal;
- generating a second encoded data signal and a second recovered clock signal from the second electrical signal;
- aggregating the first and second encoded data signals in a native mode, using a clock rate, to produce an intermediate composite signal;
- encapsulating the intermediate composite signal to produce an encapsulated composite signal; and
- serializing the encapsulated composite signal to produce a composite packet-based data stream for transmission over the optical transport system.

50. The method of claim 49 wherein the second packet-based data stream comprises Fiber Channel data.

51. The method of claim 49 wherein at least one of the first or second encoded data signals comprise 10b encoded, 10 bit parallel data at 125 MHz.

52. The method of claim 49 further comprising mapping the composite signal to a forward error correction component running at 625 MHz.

53. The method of claim 49 further comprising mapping the intermediate composite signal to 16 independent serial data ports of a forward error correction interface.

54. The method of claim 49 further comprising mapping the intermediate composite signal to 4 independent lanes of a forward error correction interface.

55. The method of claim 49 further comprising mapping the intermediate composite signal to four 2 Gigabit Fibre Channel channels.

56. The method of claim 49 further comprising providing a 25% overhead correction code.

57. An aligner circuit for converting a smaller bit data signal to a larger bit data signal, the aligner circuit comprising:
- a register configured to delay the smaller bit data signal by at least one clock tick and to output a delayed signal that includes a first plurality of data bits;
- a character compare circuit configured to receive the delayed signal and a shunted signal that includes a second plurality of data bits, wherein the compare circuit is further configured to detect a special character in the first plurality of data bits and to output an offset signal; and
- a multiplexer configured to combine the smaller bit data stream into the larger bit data signal,
- wherein the aligner circuit transmits an alignment status signal to disable an idle controller circuit when a special character is detected.

58. The aligner circuit of claim 57 wherein the first plurality of data bits includes bits 0 to 7 and the second plurality of data bits includes bits 0 to 7, wherein if the special character is detected in data bits 7 to 0 of the delayed signal and data bits 7 to 6 of the shunted signal, then the output offset signal from the character compare circuit is set to 0.

59. The aligner circuit of claim 57 wherein the first plurality of data bits includes bits 0 to 7 and the second plurality of data bits includes bits 0 to 7, wherein if the special character is detected in data bits 5 to 0 of the delayed signal and data bits 7 to 4 of the shunted signal, then the output offset signal from the character compare circuit is set to 1.

60. The aligner circuit of claim 57 wherein the first plurality of data bits includes bits 0 to 7 and the second plurality of data bits includes bits 0 to 7, wherein if the special character is detected in data bits 3 to 0 of the delayed signal and data bits 7 to 2 of the shunted signal, then the output offset signal from the character compare circuit is set to 2.

61. The aligner circuit of claim 57 wherein the first plurality of data bits includes bits 0 to 7 and the second plurality of data bits includes bits 0 to 7, wherein if the special character is detected in data bits 1 to 0 of the delayed signal and data bits 7 to 0 of the shunted signal, then the output offset signal from the character compare circuit is set to 3.

62. The aligner circuit of claim 57 wherein the first plurality of data bits includes bits 0 to 7 and the second plurality of data bits includes bits 0 to 7, wherein if the special character is detected in data bits 7 to 0 of the delayed signal and data bits 1 and 0 of the shunted signal, then the output offset signal from the character compare circuit is set to 0.

* * * * *

UNITED STATES PATENT AND TRADEMARK OFFICE
CERTIFICATE OF CORRECTION

PATENT NO. : 7,656,905 B2 Page 1 of 1
APPLICATION NO. : 10/746841
DATED : February 2, 2010
INVENTOR(S) : Sheth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this

Thirtieth Day of November, 2010

David J. Kappos
*Director of the United States Patent and Trademark Office*